(12) United States Patent
Li et al.

(10) Patent No.: US 10,750,002 B2
(45) Date of Patent: Aug. 18, 2020

(54) COMMUNICATION DEVICE

(71) Applicants: Ching-Hua Li, Taipei (TW); Li-Fang Chen, Taipei (TW); Chen-Hsien Cheng, Taipei (TW); Yi-Chang Wu, Taipei (TW); Po-Yueh Lan, Taipei (TW); Yu-Wei Lai, Taipei (TW); Kun-Chang Chen, Taipei (TW); Yi-Chun Lin, Taipei (TW)

(72) Inventors: Ching-Hua Li, Taipei (TW); Li-Fang Chen, Taipei (TW); Chen-Hsien Cheng, Taipei (TW); Yi-Chang Wu, Taipei (TW); Po-Yueh Lan, Taipei (TW); Yu-Wei Lai, Taipei (TW); Kun-Chang Chen, Taipei (TW); Yi-Chun Lin, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 0 days.

(21) Appl. No.: 16/240,793

(22) Filed: Jan. 7, 2019

(65) Prior Publication Data

US 2019/0215393 A1 Jul. 11, 2019

Related U.S. Application Data

(60) Provisional application No. 62/614,984, filed on Jan. 8, 2018.

(51) Int. Cl.
*H04M 1/60* (2006.01)
*H04M 1/02* (2006.01)

(52) U.S. Cl.
CPC ....... *H04M 1/6041* (2013.01); *H04M 1/0225* (2013.01); *H04M 1/0243* (2013.01); *H04M 1/6066* (2013.01); *H04M 2250/12* (2013.01)

(58) Field of Classification Search
CPC ............. H04M 1/6041; H04M 1/0243; H04M 1/0225; H04M 1/6066; H04M 2250/12
See application file for complete search history.

(56) References Cited

U.S. PATENT DOCUMENTS 5,883,966 A 3/1999 Kubo
7,433,654 B2 * 10/2008 Reed .................. H04M 1/0227
455/550.1

(Continued)

FOREIGN PATENT DOCUMENTS

CN 1748404 3/2006
CN 1910824 2/2007
(Continued)

OTHER PUBLICATIONS

"Office Action of Taiwan Counterpart Application," dated Mar. 10, 2020, p. 1-p. 10.

(Continued)

*Primary Examiner* — Oyesola C Ojo
(74) *Attorney, Agent, or Firm* — JCIPRNET

(57) ABSTRACT

A communication device includes a first body, a second body, a first audio module, and a second audio module. The second body is rotatably connected to the first body. The first audio module is disposed on the first body. The second audio module is at least partially disposed on the first body. When the second body rotates relatively to the first body to be in a first state to switch the communication device to be in a first operation mode, at least a portion of the first audio module is turned on, and the second audio module is turned off. When the second body rotates relatively to the first body to be in a second state to switch the communication device to be in a second operation mode, the first audio module is turned off, and the second audio module is turned on.

22 Claims, 8 Drawing Sheets

(56) References Cited

U.S. PATENT DOCUMENTS

| | | | | |
|---|---|---|---|---|
| 7,818,038 B2* | 10/2010 | Huang | | H04M 1/0237 |
| | | | | 379/433.12 |
| 8,060,161 B2* | 11/2011 | Kwak | | G06Q 20/102 |
| | | | | 345/158 |
| 8,332,000 B2* | 12/2012 | Ladouceur | | G06F 1/1622 |
| | | | | 455/566 |
| 2003/0119569 A1* | 6/2003 | Reed | | H04M 1/0227 |
| | | | | 455/575.7 |
| 2004/0203520 A1* | 10/2004 | Schirtzinger | | H04M 1/0245 |
| | | | | 455/90.3 |
| 2004/0204194 A1* | 10/2004 | Akai | | H04N 21/4233 |
| | | | | 455/575.1 |
| 2004/0266477 A1* | 12/2004 | Murata | | H04N 5/2254 |
| | | | | 455/556.1 |
| 2005/0130715 A1* | 6/2005 | Fujisawa | | H04M 1/0243 |
| | | | | 455/575.1 |
| 2007/0042762 A1* | 2/2007 | Guccione | | H04M 1/7253 |
| | | | | 455/416 |
| 2007/0149262 A1* | 6/2007 | Navntoft | | H04M 1/021 |
| | | | | 455/575.3 |
| 2008/0242380 A1* | 10/2008 | Kajihara | | H04M 1/0225 |
| | | | | 455/575.4 |
| 2008/0311958 A1* | 12/2008 | Oswald | | G06F 3/1423 |
| | | | | 455/566 |
| 2009/0088222 A1* | 4/2009 | Numano | | H04M 1/0235 |
| | | | | 455/569.1 |
| 2009/0113456 A1* | 4/2009 | Chien | | G06F 1/1622 |
| | | | | 719/321 |
| 2010/0041451 A1* | 2/2010 | Washiyama | | H04M 1/0225 |
| | | | | 455/575.4 |
| 2010/0210327 A1* | 8/2010 | Kim | | H04M 1/035 |
| | | | | 455/575.3 |
| 2013/0078930 A1* | 3/2013 | Chen | | H04M 1/03 |
| | | | | 455/74 |
| 2013/0129134 A1* | 5/2013 | Parraga Ginneno | | H04R 1/02 |
| | | | | 381/338 |
| 2017/0264734 A1* | 9/2017 | Lee | | H04M 1/6041 |

FOREIGN PATENT DOCUMENTS

| | | |
|---|---|---|
| CN | 102196079 | 9/2011 |
| CN | 203482246 | 3/2014 |

OTHER PUBLICATIONS

"Office Action of China Counterpart Application", dated Apr. 29, 2020, p. 1-p. 18.

* cited by examiner

COMMUNICATION DEVICE

CROSS-REFERENCE TO RELATED APPLICATION

This application claims the priority benefits of U.S. provisional application Ser. No. 62/614,984, filed on Jan. 8, 2018. The entirety of each of the above-mentioned patent applications is hereby incorporated by reference herein and made a part of specification.

TECHNICAL FIELD

The disclosure relates to an electronic device; more particularly, the disclosure relates to a communication device.

DESCRIPTION OF RELATED ART

With the development of network communication technologies, various network communication devices are gradually popularized in the consumer market, such as personal VoIP phones or conference phones for conducting multi-party communication conferences. In a case of a personal VoIP phone, the small size thereof allows a user to easily take it and hold it around the ear to make a call, while in a case of a conference phone, sufficient volume is required to set up a high-powered speaker and to expose a sufficient number of microphones. However, at present, there is no communication device that integrates the above characteristics of the two types of telephones, so that consumers need to use different communication devices for personal communication and multi-party conference communication.

SUMMARY

The disclosure provides a communication device that can be switched to different operation modes.

In an embodiment, a communication device including a first body, a second body, a first audio module, and a second audio module is provided. The second body is rotatably connected to the first body. The first audio module is disposed on the first body. The second audio module is at least partially disposed on the first body. When the second body rotates relatively to the first body to be in a first state, which switch the communication device to be in a first operation mode, at least a portion of the first audio module is turned on, and the second audio module is turned off. When the second body rotates relatively to the first body to be in a second state to switch the communication device to be in a second operation mode, the first audio module is turned off, and the second audio module is turned on.

According to an embodiment, the first audio module includes at least one first speaker assembly and at least one first microphone assembly, and the second audio module includes at least one second speaker assembly and at least one second microphone assembly.

According to an embodiment, the number of the at least one first speaker assembly is two, the number of the at least one first microphone assembly is two, and when the second body is in the first state, one of the two first speaker assemblies and one of the two first microphone assemblies are turned on, while the other one of the two first speaker assemblies and the other one of the two first microphone assemblies are turned off.

According to an embodiment, one of the two first speaker assemblies and one of the two first microphone assemblies are located at a first end of the first body, the other one of the two first speaker assemblies and the other one of the two first microphone assemblies are located at a second end of the first body, when the second body is in the first state, and the first end is located above the second end, the one of the two first speaker assemblies located at the first end and the other one of the two first microphone assemblies located at the second end are turned on, and when the second body is in the first state, and the second end is located above the first end, the other one of the two first speaker assemblies located at the second end and the one of the two first microphone assemblies located at the first end are turned on.

According to an embodiment, the first body has a sensor adapted to sense a relative location of the first end and the second end.

According to an embodiment, power of the at least one second speaker assembly is greater than power of the at least one first speaker assembly.

According to an embodiment, the number of the at least one second microphone assembly is plural, and the second microphone assemblies constitute a microphone array.

According to an embodiment, the number of the at least one second microphone assembly is plural, some of the second microphone assemblies are disposed on the first body, and the other second microphone assemblies are disposed on the second body.

According to an embodiment, the second body is adapted to rotate relatively to the first body to be in different states between the first state and the second state, so as to activate different functions of the communication device, respectively.

According to an embodiment, when the second body is in the first state, the second body covers at least one portion of the second audio module, and when the second body is in the second state, the at least one portion of the second audio module is exposed by the second body.

According to an embodiment, the first operation mode is a personal communication mode, and the second operation mode is a multi-party conference mode.

According to an embodiment, the first body has a switch, when the second body triggers the switch, the communication device is in the first operation mode, and when the second body does not trigger the switch, the communication device is in the second operation mode.

In an embodiment, a communication device including a first body, at least one second audio module, and a second body is provided. The first body has a lower casing and an upper casing, wherein the upper casing is liftably connected to the lower casing, and at least one resonance space is formed between the upper casing and the lower casing. The at least one audio module is at least partially disposed on at least one of the upper casing and the lower casing. The second body is rotatably connected to the first body, wherein the second body is adapted to rotate relatively to the first body and switch an operation mode of the communication device, and the second body rotates relatively to the first body and drives the upper casing to elevate or subside relatively to the lower casing, so as to change a volume of the at least one resonance space, wherein when the second body rotates relatively to the first body to be in a first state, the communication device is switched to be in a first operation mode, and when the second body rotates relatively to the first body to be in a second state, the communication device is switched to be in a second operation mode.

According to an embodiment, the second body has at least one protruding pillar, the upper casing has at least one guiding groove, the at least one protruding pillar is located in the at least one guiding groove, when the second body rotates relatively to the first body, the at least one protruding pillar moves along the at least one guiding groove and pushes an inner wall of the at least one guiding groove to drive the upper casing to elevate or subside relatively to lower casing.

According to an embodiment, the second body has a rotation axle, the upper casing has a sleeve, the rotation axle passes through the sleeve and is pivotally connected to the lower casing, the at least one protruding pillar is connected to an outer wall of the rotation axle, and the at least one guiding groove is formed on an inner wall of the sleeve.

According to an embodiment, an extension direction of the at least one guiding groove is inclined to an elevating and subsiding direction of the upper casing.

According to an embodiment, a top end of the sleeve has at least one gap connected to the at least one guiding groove.

According to an embodiment, the first body has a pivoting assembly at the lower casing, the pivoting assembly protrudes into the sleeve, and the rotation axle is pivotally connected to the lower casing through the pivoting assembly.

According to an embodiment, the second body is rotatably connected to the first body along a rotation axis, and the rotation axis is parallel to an elevating and subsiding direction of the upper casing.

According to an embodiment, the second body is adapted to rotate relatively to the first body, so as to switch operation modes of the communication device.

According to an embodiment, the at least one audio module includes a first audio module and a second audio module, the first audio module is disposed on the first body, the second audio module is at least partially disposed on the first body, wherein when the second body is operated relatively to the first body to be in the first state to switch the communication device to the first operation mode, at least one portion of the first audio module is turned on, and the second audio module is turned off, and when the second body is operated relatively to the first body to be in the second state to switch the communication device to be in the second operation mode, the first audio module is turned off, and the second audio module is turned on.

According to an embodiment, the at least one resonance space includes a first resonance space and a second resonance space, the first audio module includes two first speaker assemblies and two first microphone assemblies, one of the two first speaker assemblies and one of the two first microphone assemblies are disposed in the first resonance space, and the other one of the two first speaker assemblies and the other one of the two first microphone assemblies are disposed in the second resonance space.

According to an embodiment, the communication device includes a sensor disposed in the first body and adapted to sense a relative location of the first resonance space and the second resonance space.

According to an embodiment, when the second body covers the first audio module, and the sensor senses the first resonance space to be located above the second resonance space, the one of the two first speaker assemblies disposed in the first resonance space and the other one of the two first microphone assemblies disposed in the second resonance space are turned on, and the other one of the two first speaker assemblies disposed in the second resonance space and the one of the two first microphone assemblies disposed in the first resonance space are turned off.

According to an embodiment, the second audio module comprises a plurality of second speaker assemblies and a plurality of second microphone assemblies, some of the plurality of second speaker assemblies and some of the plurality of second microphone assemblies are disposed in the first resonance space, and the other second speaker assemblies and the other second microphone assemblies are disposed in the second resonance space.

According to an embodiment, when the second body exposes at least one portion of the second audio module, the second audio module is turned on.

According to an embodiment, the first body has a switch, when the second body rotates and triggers the switch, the communication device is in the first operation mode, and when the second body rotates and does not trigger the switch, the communication device is in the second operation mode.

In view of the above, in the communication device provided herein, the second body can be operated relatively to the first body to be in the first state, so as to switch the communication device to be in the first operation mode. In the first operation mode, the corresponding communication functions (e.g., the personal communication functions) can be performed by the first audio module. On the other hand, the second body can be operated relatively to the first body to be in the second state, so as to switch the communication device to be in the second operation mode. In the second operation mode, the corresponding communication functions (e.g., the multi-party communication conference functions) can be performed by the second audio module. That is, the communication device provided herein is able to be applied in different operation modes for personal communications and multi-party communication conferences; thus, the communication device is characterized by universality in use. Besides, when the second body is operated relatively to the first body to be in the second state, the second body drives the upper casing of the first body to elevate relatively to the lower casing, so as to expand the resonance space of the first body and ensure that the communication device can achieve good amplifying effects through the expanded resonance space during the multi-party communication conference.

To make the above features and advantages provided in one or more of the embodiments more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles described herein.

DESCRIPTION OF THE EMBODIMENTS

Figure 1:
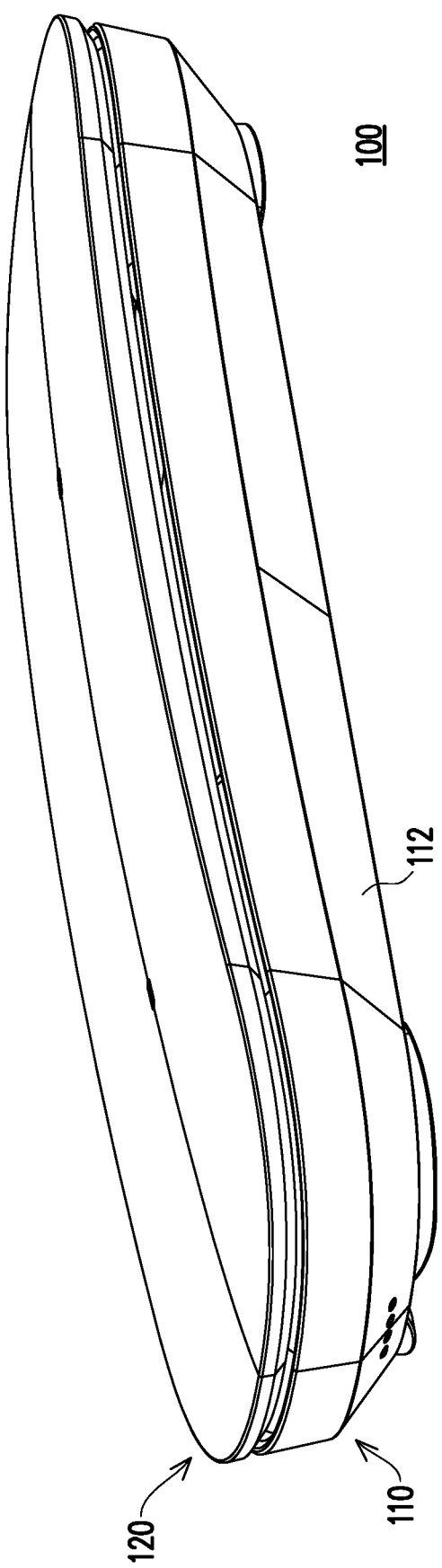
FIG. 1 is a three-dimensional view of a communication device according to an embodiment.
Figure 2:
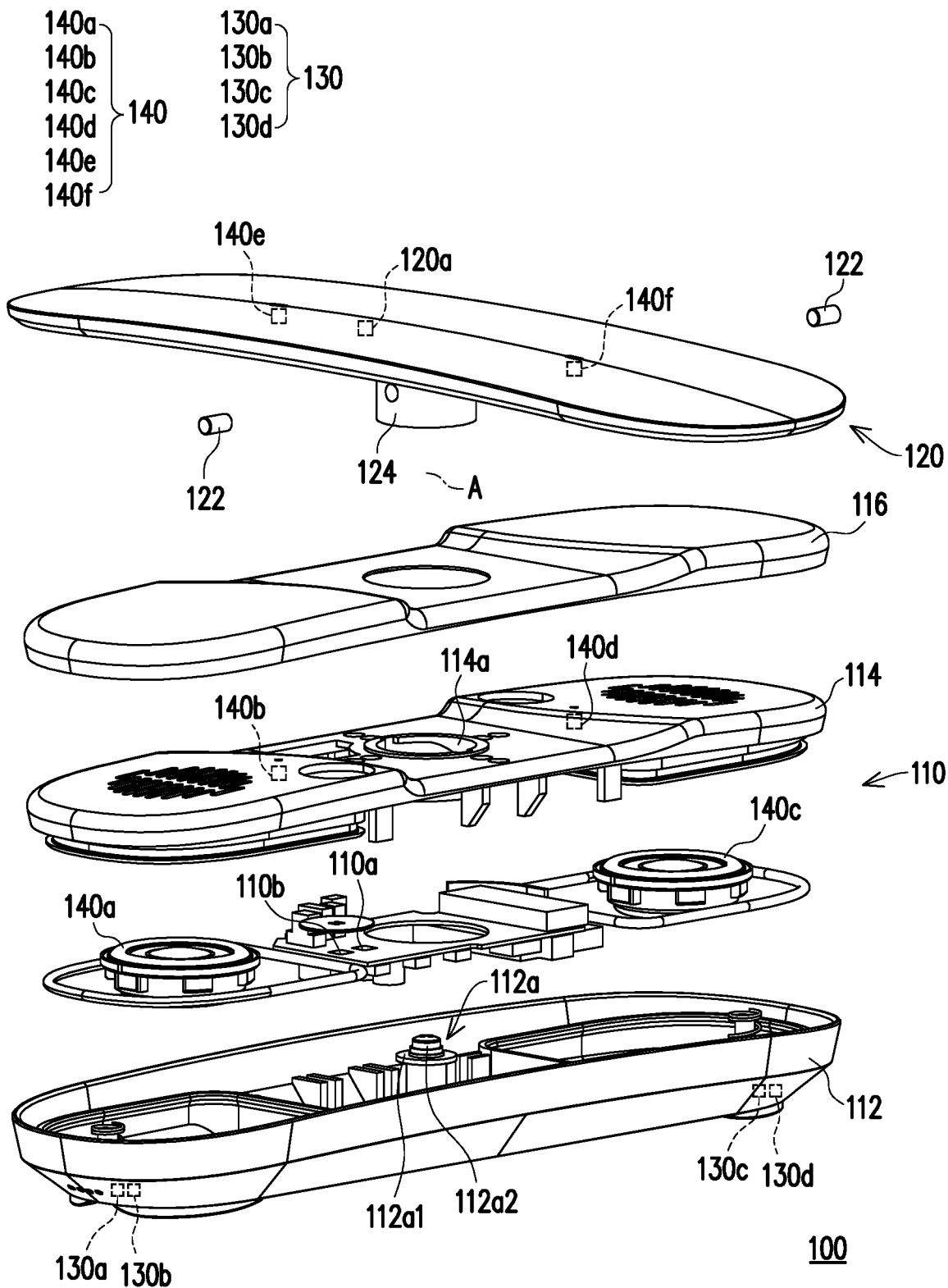
FIG. 2 is an exploded view of the communication device depicted in FIG. 1.

FIG. 1 is a three-dimensional view of a communication device according to an embodiment. FIG. 2 is an exploded view of the communication device depicted in FIG. 1. With reference to FIG. 1 and FIG. 2, the communication device 100 provided in the present embodiment includes a first body 110, a second body 120, a first audio module 130, and a second audio module 140. The second body 120 is rotatably connected to the first body 110 along a rotation axis A. The first audio module 130 includes two first speaker assemblies 130a and 130c and two first microphone assemblies 130b and 130d, and the first speaker assemblies 130a and 130c and the first microphone assemblies 130b and 130d are disposed on the first body 110. The second audio module 140 includes two second speaker assemblies 140a and 140c and four second microphone assemblies 140b, 140d, 140e, and 140f; the second speaker assemblies 140a and 140c and the second microphone assemblies 140b and 140d are disposed on the first body 110, and the second microphone assemblies 140e and 140f are disposed on the second body 120.

In the present embodiment, the first speaker assemblies 130a and 130c and the first microphone assemblies 130b and 130d are, for instance, configured to perform a function of personal communication, and the second speaker assemblies 140a and 140c and the second microphone assemblies 140b, 140d, 140e, and 140f are, for instance, configured to perform a function of conducting multi-party communication conference. The implementation manner is described below.

Figure 3A:
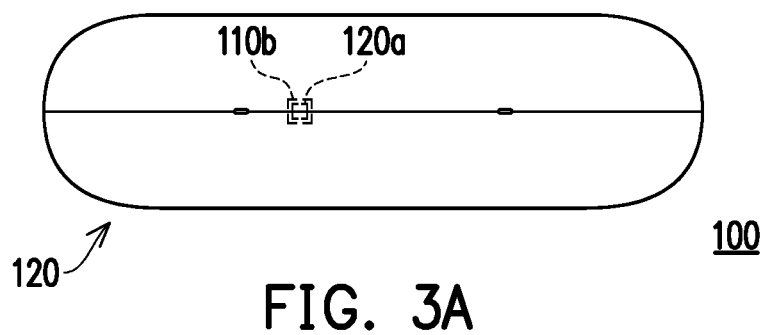
FIG. 3A to FIG. 3C illustrate that the second body depicted in FIG. 1 rotates relatively to the first body.
Figure 3B:
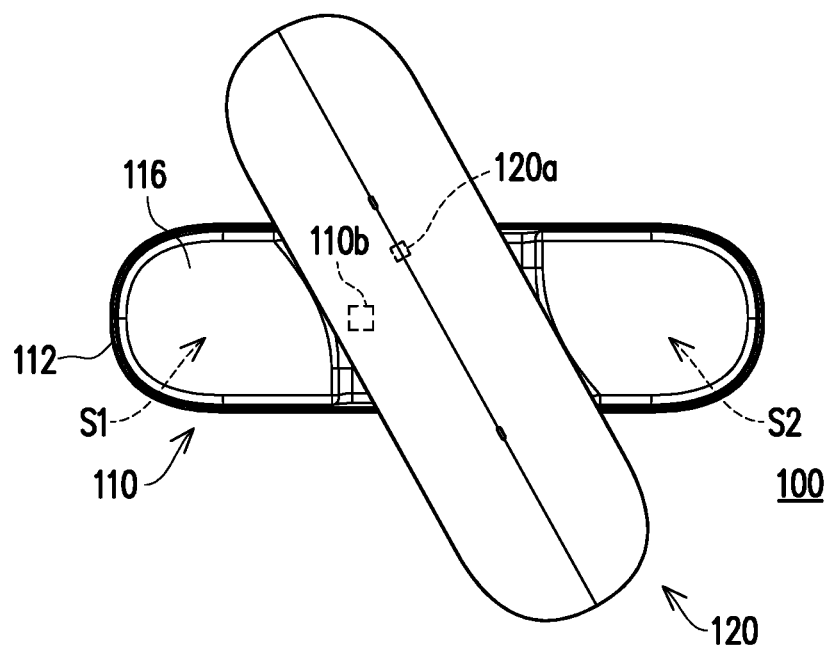
Figure 3C:
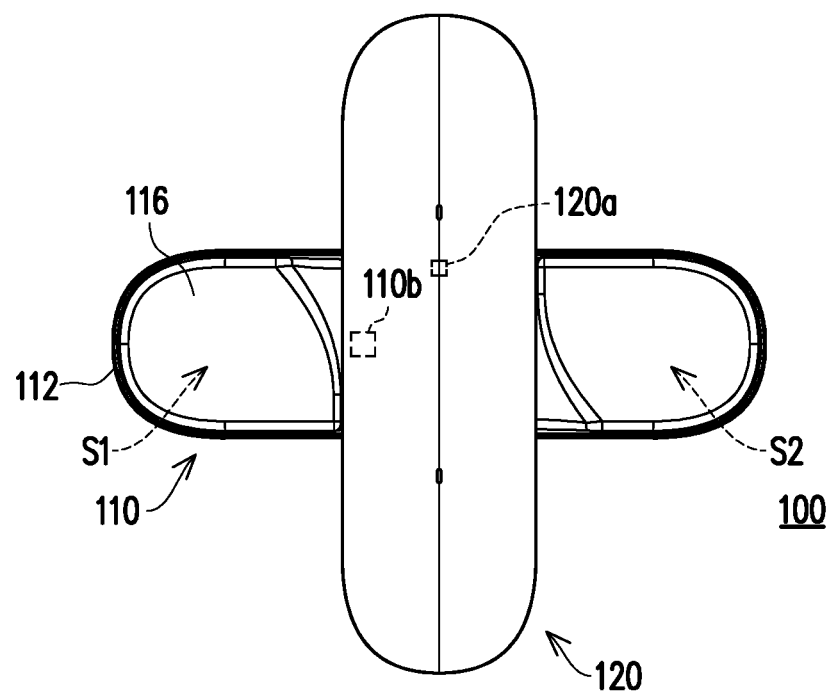
Figure 4:
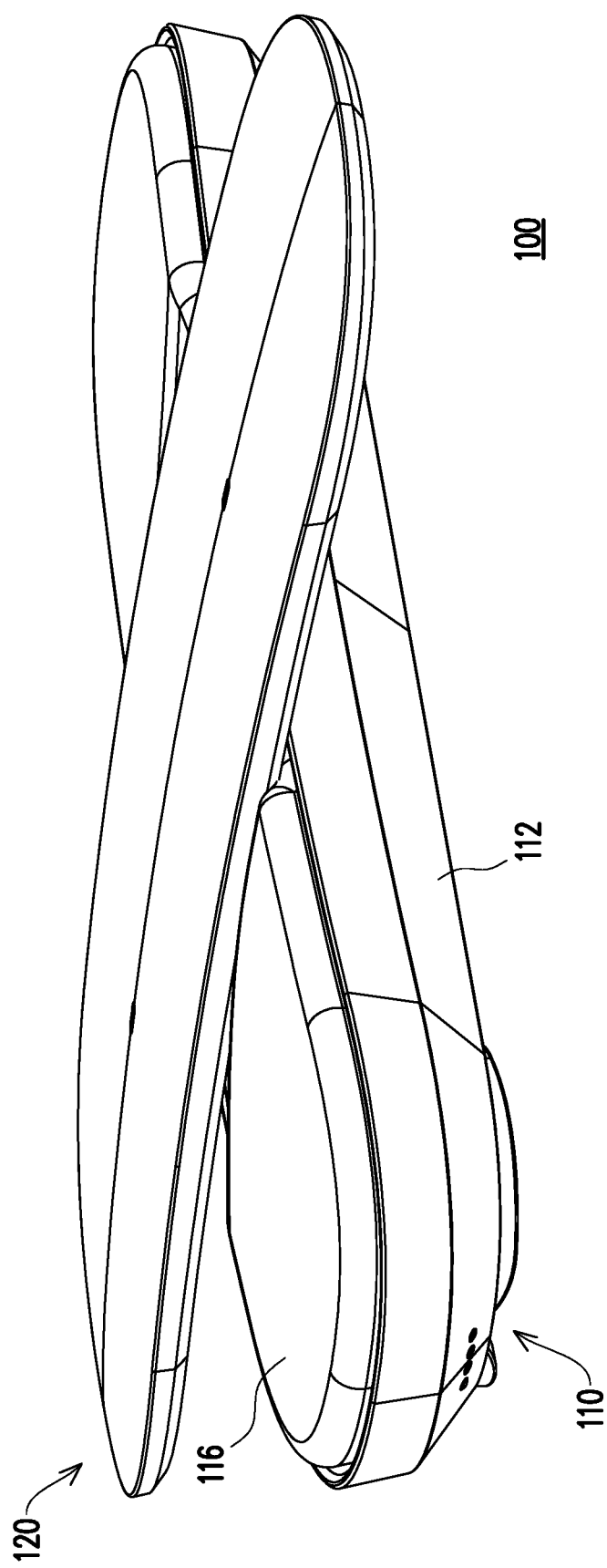
FIG. 4 is a three-dimensional view of the communication device depicted in FIG. 3C.

FIG. 3A to FIG. 3C illustrate that the second body depicted in FIG. 1 rotates relatively to the first body. FIG. 4 is a three-dimensional view of the communication device depicted in FIG. 3C. The second body 120 can rotate relatively to the first body 110 as shown in FIG. 3A to FIG. 3C. When the second body 120 rotates and is operated relatively to the first body 110 to be in a first state as shown in FIG. 1 and FIG. 3A, which switches the communication device 100 into a first operation mode (e.g., a personal communication mode), the first speaker assembly 130a and the first microphone assembly 130b are turned on, or the first speaker assembly 130c and the first microphone assembly 130d are turned on, and the second speaker assemblies 140a and 140c and the second microphone assemblies 140b, 140d, 140e, and 140f are turned off, so as to provide the function of personal communication through the first speaker assembly 130a and the first microphone assembly 130b or through the first speaker assembly 130c and the first microphone assembly 130d. When the second body 120 rotates and is operated relatively to the first body 110 to be in a second state as shown in FIG. 3C and FIG. 4, which switches the communication device 100 into a second operation mode (e.g., a multi-party conference mode), the first speaker assemblies 130a and 130c and the first microphone assemblies 130b and 130d are turned off, and the second speaker assemblies 140a and 140c and the second microphone assemblies 140b, 140d, 140e, and 140f are turned on, so as to provide the function of multi-party communication conference through the second speaker assemblies 140a and 140c and the second microphone assemblies 140b, 140d, 140e, and 140f. That is, the communication device 100 in different operation modes can perform the function of personal communication and the function of multi-party communication conference and can thus be characterized by universality in use.

In the present embodiment, the first body 110 has a switch 110b. When the second body 120 rotates to be in the first state as shown in FIG. 1 and FIG. 3A and triggers the switch 110b, the communication device 100 is switched into the first operation mode. When the second body 120 rotates to be in the second state as shown in FIG. 3C and FIG. 4 without triggering the switch 110b, the communication device 100 is switched into the second operation mode. For instance, the switch 110b may be a reed switch, and the second body 120 correspondingly has a magnetic component 120a (e.g., a magnet), and the magnetic component 120a in the first state as shown in FIG. 3A is configured to trigger the switch 110b. In other embodiments, the switch 110b may be a Hall sensor or a trigger element of any other type, which should however not be construed as a limitation in the disclosure.

The way to perform the function of personal communication by the communication device 100 through the first speaker assemblies 130a and 130c and the first microphone assemblies 130b and 130d is elaborated hereinafter.

As shown in FIG. 2, the first speaker assembly 130a and the first microphone assembly 130b are located in a resonance space S1 (shown in FIG. 3B and FIG. 3C) at a first end of the first body 110 (the left end of the first body 110 in FIG. 2), and the other first speaker assembly 130c and the other first microphone assembly 130d are located in a resonance space S2 (shown in FIG. 3B and FIG. 3C) at a second end of the first body 110 (the right end of the first body 110 in FIG. 2). Besides, the first body 110 has a sensor 110a, and the sensor 110a is adapted to sense a relative location of the first end as well as its resonance space S1 and the second end and its resonance space S2. The sensor 110a is, for instance, a gyroscope, an accelerometer, or any other dynamic sensor, which should however not be construed as a limitation in the disclosure.

In view of the above, when the second body 120 is in the first state as shown in FIG. 1 and FIG. 3A and covers the first audio module 130, and the sensor 110a senses that the first end of the first body 110 and its resonance space S1 are located above the second end and its resonance space S2, the communication device 100 considers the present state as the following: the first end corresponds to a user's ear, and the second end corresponds to the user's mouth, whereby first speaker assembly 130a located at the first end and the first microphone assembly 130d located at the second end are turned on, and the first speaker assembly 130c located at the second end and the first microphone assembly 130b located at the first end are turned off; as such, the user can communicate in a smooth manner through the first speaker assembly 130a and the first microphone assembly 130d. Similarly, when the second body 120 is in the first state as shown in FIG. 1 and FIG. 3A, and the sensor 110a senses that the second end of the first body 110 is located above the first end, the communication device 100 considers the present state as the following: the second end corresponds to the user's ear, and the first end corresponds to the user's mouth, whereby the first speaker assembly 130c located at the second end and the first microphone assembly 130b located at the first end are turned on, and the first speaker assembly 130a located at the first end and the first microphone assembly 130d located at the second end are turned off; as such, the user can communicate in a smooth manner through the first speaker assembly 130c and the first microphone assembly 130b.

The way to perform the function of multi-party communication conference by the communication device 100 through the second speaker assemblies 140a and 140c and the second microphone assemblies 140b, 140d, 140e, and 140f is elaborated hereinafter.

Power of the second speaker assemblies 140a and 140c is greater than power of the first speaker assemblies 130a and 130c, so as to achieve better amplifying effects through the second speaker assemblies 140a and 140c during a multi-party communication conference. The power of the second speaker assemblies 140a and 140c is 3 W or any other appropriate power, which should not be construed as a limitation in the disclosure. On the other hand, when the second body 120 is in the second state as shown in FIG. 3C and FIG. 4, the second microphone assemblies 140b, 140d, 140e, and 140f constitute a microphone array, so as to accurately identify where the sound comes from and provide good sound-receiving signals.

Besides, in the present embodiment, when the second body 120 is in the first state as shown in FIG. 1 and FIG. 3A, which enables the communication device 100 to be configured to perform the function of personal communication, the second speaker assemblies 140a and 140c and the second microphone assemblies 140b and 140d are not operated and are covered by the second body 120. By contrast, when the second body 120 is in the first state as shown in FIG. 3C and FIG. 4, which enables the communication device 100 to be configured to perform the function of conducting the multi-party communication conference, the second speaker assemblies 140a and 140c and the second microphone assemblies 140b and 140d are exposed by the second body 120, and the second audio module 140 is turned on. Note that the second body 110 provided in the present embodiment includes a lower casing 112, an upper casing 114, and a cover 116. The second speaker assemblies 140a and 140c and the second microphone assemblies 140b and 140d are disposed on at least one of the upper casing 114 and the lower casing 112 and located between the upper casing 114 and the lower casing 112, and the cover 116 covers the upper casing 114; therefore, in FIG. 3C and FIG. 4, it is unlikely to direct see the second speaker assemblies 140a and 140c and the second microphone assemblies 140b and 140d.

Specifically, in the first body 110 provided in the present embodiment, the upper casing 114 is liftably connected to the lower casing 112, the rotation axis A of the second body 120 is parallel to an elevating and subsiding direction of the upper casing 112, and the resonance space is formed between the upper casing 114 and the lower casing 112 (the first resonance space S1 and the second resonance space S2 are marked in FIG. 3B and FIG. 3C). The second speaker assembly 140a and the second microphone assembly 140b are disposed on the first resonance space S1, and the second speaker assembly 140c and the second microphone assembly 140d are disposed on the first resonance space S2. The second body 120 is adapted to rotate relatively to the first body 110 and drive the upper casing 114 to elevate or subside relatively to the lower casing 112, so as to change a volume of the resonance space. This will be elaborated in the following paragraphs with reference to drawings.

Figure 5A:
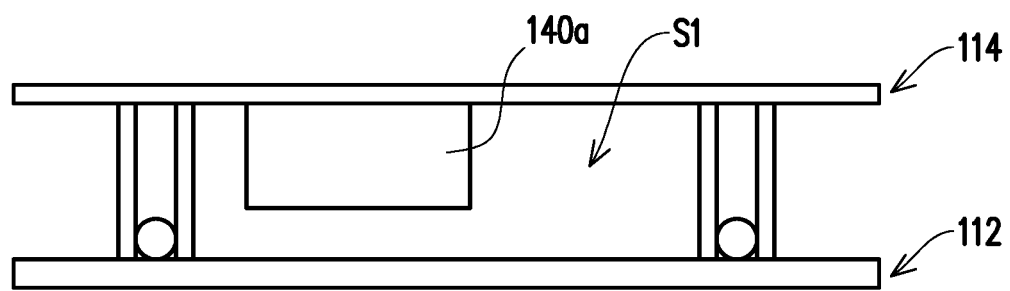
FIG. 5A and FIG. 5B are schematic views illustrating that the upper casing depicted in FIG. 2 elevates or subsides relatively to the lower casing.
Figure 5B:
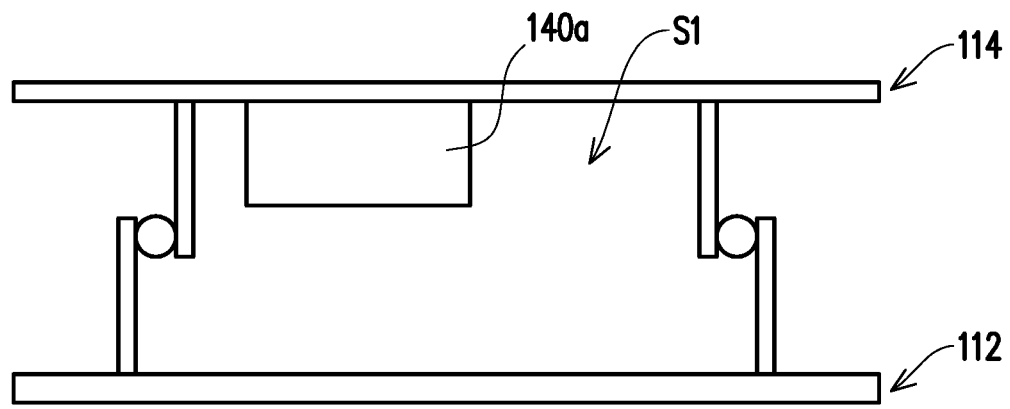

FIG. 5A and FIG. 5B are schematic views illustrating that the upper casing depicted in FIG. 2 elevates or subsides relatively to the lower casing. When the second body 120 is in the first state as shown in FIG. 1 and FIG. 3A, the upper casing 114 is located at a lower position shown in FIG. 5A; when the second body 120 is rotated to be in the second state as shown in FIG. 3C and FIG. 4, the upper casing 114 elevates relatively to the lower casing 112 to be at a higher position shown in FIG. 5B. At this time, the resonance space (e.g., the first resonance space S1) between the upper casing 114 and the lower casing 112 is expanded, so that the second speaker assembly (e.g., the second speaker assembly 140a) between the upper casing 114 and the lower casing 112 can achieve better sound-amplifying effects due to the expanded resonance space. Additionally, the second speaker assembly (e.g., the second speaker assembly 140a) provided in the present embodiment is disposed on the upper casing 114 and can elevate together with the upper casing 114, so as to further improve the sound-amplifying effects.

How the second body 120 drives the upper casing 114 to elevate or subside is explained below.

Figure 6:
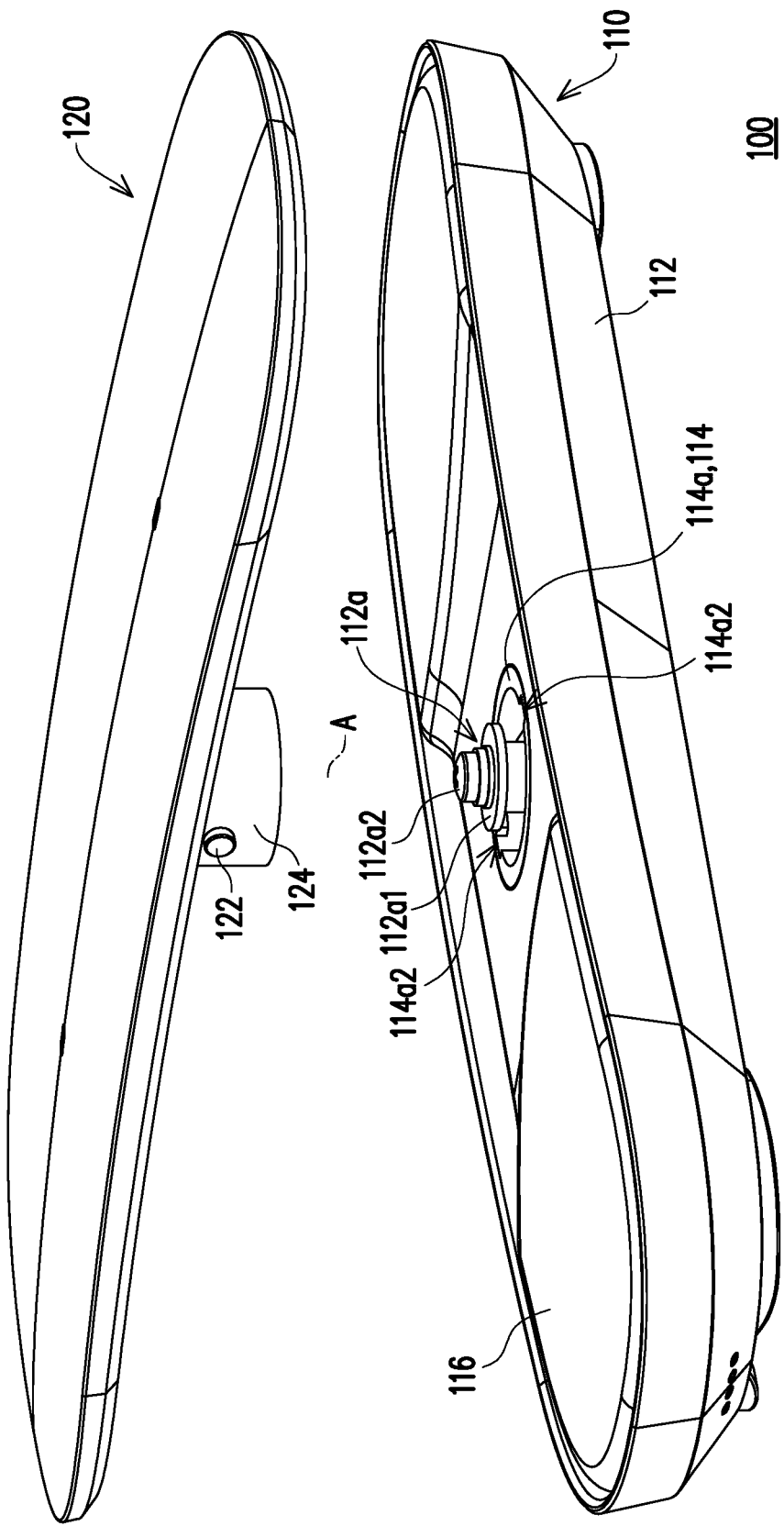
FIG. 6 is an exploded view of the communication device depicted in FIG. 1.
Figure 7:
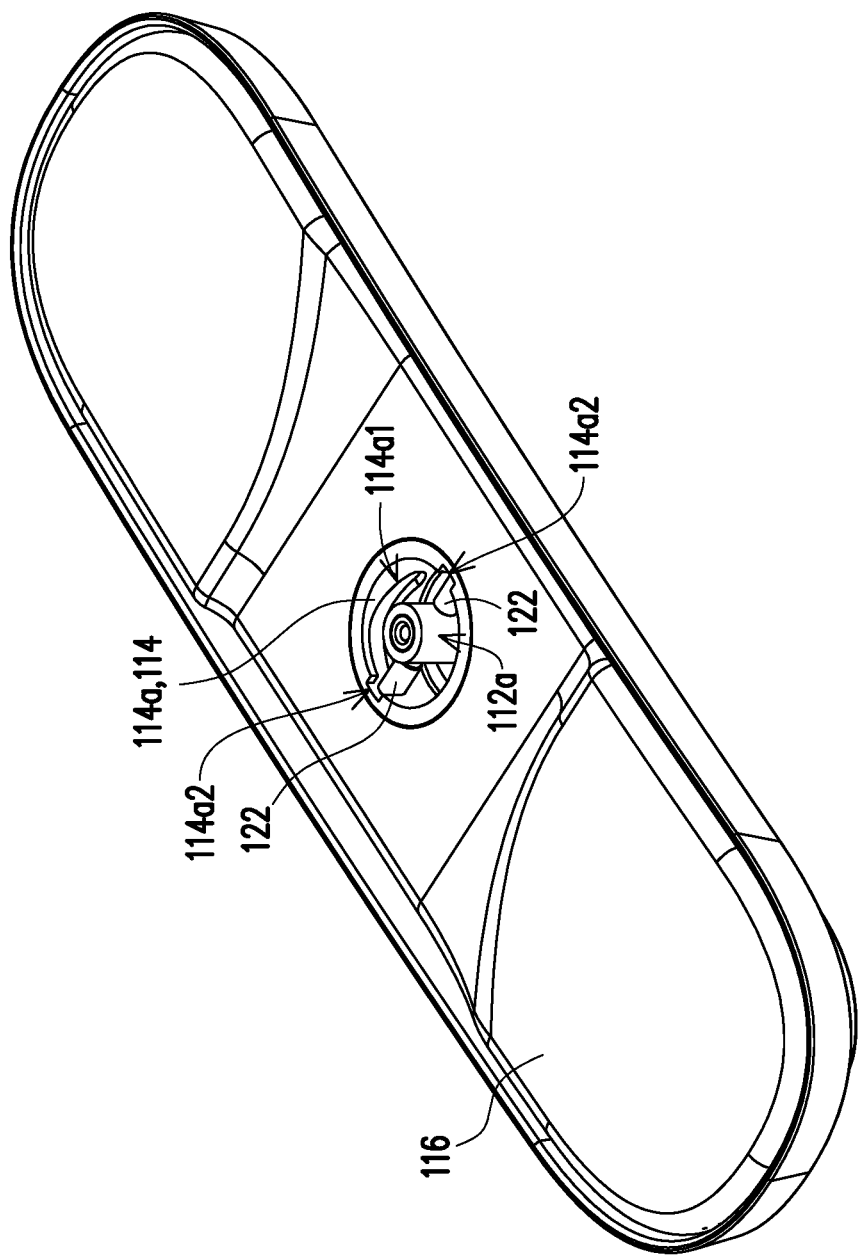
FIG. 7 is a three-dimensional view of some components in the communication device depicted in FIG. 1.

FIG. 6 is an exploded view of the communication device depicted in FIG. 1. FIG. 7 is a three-dimensional view of some components in the communication device depicted in FIG. 1. With reference to FIG. 2, FIG. 6, and FIG. 7, the second body 120 provided in the present embodiment has two protruding pillars 122, the upper casing 114 has two guiding grooves 114a1 respectively corresponding to the two protruding pillars 122 (only one guiding groove 144a1 is shown in FIG. 7 due to the viewing angle), and each protruding pillar 122 is located in the corresponding guiding groove 114a1. An extension direction of the guiding groove 114a1 is inclined to the elevating and subsiding direction of the upper casing 114; thereby, when the second body 120 rotates relatively to the first body 110, each protruding pillar 122 of the second body 120 moves along the corresponding guiding groove 114a1 and pushes the inner wall of the guiding groove 114a1, so as to drive the upper casing 114 to elevate or subside relatively to the lower casing 112. For instance, when the second body 120 in the first state as shown in FIG. 3A rotates in a clockwise direction to be in the second state as shown in FIG. 3C, the second body 120 drives the upper casing 114 to elevate to the position shown in FIG. 5B from the position shown in FIG. 5A; when the second body 120 in the second state as shown in FIG. 3C rotates in a counter-clockwise direction to be in the first state shown in FIG. 3A, the second body 120 drives the upper casing 114 to subside to the position shown in FIG. 5A from the position shown in FIG. 5B.

To be more specific, the first body 110 provided in the present embodiment has a pivoting assembly 112a at the lower casing 112. The second body 120 has rotation axle 124 (shown in FIG. 7). Each protruding pillar 122 is connected to the outer wall of the rotation axle 124. The upper casing 114 has a sleeve 114a, the pivoting assembly 112a is extended into the sleeve 114a, and the rotation axle 124 passes through the sleeve 114a and is pivotally connected to the lower casing 112 through the pivoting assembly 112a. Each guiding groove 114a1 is formed at the inner wall of the sleeve 114a and faces the corresponding protruding pillar 122, so that each protruding pillar 122 can be extended into the corresponding guiding groove 114a1.

Note that the pivoting assembly 112a provided in the present embodiment interferes with the structure in the rotation axle 124 through the gasket 112a1 of the pivoting assembly 112a, so that the rotation axle 124 and the pivoting assembly 112a are not separated from each other in a direction parallel to the rotation axis A, and that the pivoting assembly 112a fixes the gasket 112a1 through its screw 112a2. In FIG. 7, in order to clearly show the guiding groove 114a1 and the protruding pillar 122, the gasket 112a1 and the screw 112a2 are not illustrated, and nor is the rotation axle 124 connected to the protruding pillar 122. Besides, as indicated in FIG. 7, a top end of the sleeve 114a provided in the present embodiment has at least two gaps 114a2 respectively connected to the corresponding guiding grooves 114a1, so that each protruding pillar 122 can enter the corresponding guiding groove 114a1 through the corresponding gap 114a2 during assembly.

In the present embodiment, the communication device 100 can communicate with a remote end through wireless communications, e.g., WiFi, Bluetooth, and so on, and signals can be transmitted through a personal computer, a notebook computer, a tablet PC, a smart phone, or any other external equipment. The type of the wireless communications and the type of the external equipment are not limited herein.

According to the present embodiment, the second body 120 not only can be rotated by 90 degrees relatively to the first body 110 (as shown in FIG. 3A to FIG. 3C) to be in the first state or in the second state for switching the operation mode of the communication device 100 but also can be rotated relatively to the first body 110 to be in different states between the first state and the second state, so as to activate various functions of the communication device 100. For instance, when the second body 120 rotates relatively to the first body 110 by a certain angle (e.g., 10 degrees, 20 degrees, 30 degrees, 40 degrees, 50 degrees, 60 degrees, 70 degrees, or 80 degrees), the functions of muting the communication device 100, adjusting the broadcast volume, activating the battery indicator, activating the signal strength indicator, switching channels, switching to different wireless signals, and other functions may be performed.

To sum up in the communication device provided herein, the second body can be operated relatively to the first body to be in the first state, so as to switch the communication device into the first operation mode. In the first operation mode, the first audio module is applied to perform the corresponding communication function (e.g., the function of personal communication). On the other hand, the second body can be operated relatively to the first body to be in the second state, so as to switch the communication device to be in the second operation mode. In the second operation mode, the corresponding communication functions (e.g., the multi-party communication conference functions) can be performed by the second audio module. That is, the communication device provided herein is able to be applied in different operation modes for personal communications and multi-party communication conferences; thus, the communication device is characterized by universality in use. Besides, when the second body is operated relatively to the first body to be in the second state, the second body drives the upper casing of the first body to elevate relatively to the lower casing, so as to expand the resonance space of the first body and ensure that the communication device can achieve good sound-amplifying effects through the expanded resonance space during the multi-party communication conference.

Although the disclosure has been disclosed by the above embodiments, the embodiments are not intended to limit the disclosure. It will be apparent to those skilled in the art that various modifications and variations can be made to the structure of the disclosure without departing from the scope or spirit of the disclosure. Therefore, the protecting range of the disclosure falls in the appended claims.

What is claimed is:

1. A communication device comprising:
a first body;
a second body, rotatably connected to the first body;
a first audio module, disposed on the first body and comprising two first speaker assemblies and two first microphone assemblies; and
a second audio module, at least partially disposed on the first body and comprising at least one second speaker assembly and at least one second microphone assembly,
wherein when the second body rotates relatively to the first body to be in a first state to switch the communication device to be in a first operation mode, at least one portion of the first audio module is turned on, and the second audio module is turned off; when the second body rotates relatively to the first body to be in a second state to switch the communication device to be in a second operation mode, the first audio module is turned off, and the second audio module is turned on,
wherein when the second body is in the first state, one of the two first speaker assemblies and one of the two first microphone assemblies are turned on, while the other one of the two first speaker assemblies and the other one of the two first microphone assemblies are turned off,
wherein one of the two first speaker assemblies and one of the two first microphone assemblies are located at a first end of the first body, the other one of the two first speaker assemblies and the other one of the two first microphone assemblies are located at a second end of the first body, when the second body is in the first state, and the first end is located above the second end, the one of the two first speaker assemblies located at the first end and the other one of the two first microphone assemblies located at the second end are turned on, and when the second body is in the first state, and the second end is located above the first end, the other one of the two first speaker assemblies located at the second end and the one of the two first microphone assemblies located at the first end are turned on.

2. The communication device according to claim 1, wherein the first body has a sensor adapted to sense a relative location of the first end and the second end.

3. The communication device according to claim 1, wherein power of the at least one second speaker assembly is greater than power of the at least one first speaker assembly.

4. The communication device according to claim 1, wherein the number of the at least one second microphone assembly is plural, and the second microphone assemblies constitute a microphone array.

5. The communication device according to claim 1, wherein the number of the at least one second microphone assembly is plural, some of the second microphone assemblies are disposed on the first body, and the other second microphone assemblies are disposed on the second body.

6. The communication device according to claim 1, wherein the second body is adapted to rotate relatively to the first body to be in different states between the first state and the second state, so as to activate different functions of the communication device, respectively.

7. The communication device according to claim 1, wherein when the second body is in the first state, the second body covers at least one portion of the second audio module, and when the second body is in the second state, the at least one portion of the second audio module is exposed by the second body.

8. The communication device according to claim 1, wherein the first body has a switch, when the second body triggers the switch, the communication device is in the first operation mode, and when the second body does not trigger the switch, the communication device is in the second operation mode.

9. The communication device according to claim 1, wherein the first operation mode is a personal communication mode, and the second operation mode is a multi-party conference mode.

10. A communication device comprising:
a first body, having a lower casing and an upper casing, wherein the upper casing is liftably connected to the lower casing, and at least one resonance space is formed between the upper casing and the lower casing;
at least one audio module, at least partially disposed on at least one of the upper casing and the lower casing; and
a second body, rotatably connected to the first body, wherein the second body is adapted to rotate relatively to the first body and switch an operation mode of the communication device, and the second body rotates relatively to the first body and drives the upper casing to elevate or subside relatively to the lower casing, so as to change a volume of the at least one resonance space, wherein when the second body rotates relatively to the first body to be in a first state, the communication device is switched to a first operation mode, and when the second body rotates relatively to the first body to be in a second state, the communication device is switched to a second operation mode,
wherein the at least one audio module comprises a first audio module and a second audio module, the first audio module is disposed on the first body, the second audio module is at least partially disposed on the first body, wherein when the second body is operated relatively to the first body to be in the first state to switch the communication device to be in the first operation mode, at least one portion of the first audio module is turned on, and the second audio module is turned off, and when the second body is operated relatively to the first body to be in the second state to switch the communication device to be in the second operation mode, the first audio module is turned off, and the second audio module is turned on.

11. The communication device according to claim 10, wherein the second body has at least one protruding pillar, the upper casing has at least one guiding groove, the at least one protruding pillar is located in the at least one guiding groove, when the second body rotates relatively to the first body, the at least one protruding pillar moves along the at least one guiding groove and pushes an inner wall of the at least one guiding groove to drive the upper casing to elevate or subside relatively to lower casing.

12. The communication device according to claim 11, wherein the second body has a rotation axle, the upper casing has a sleeve, the rotation axle passes through the sleeve and is pivotally connected to the lower casing, the at least one protruding pillar is connected to an outer wall of the rotation axle, and the at least one guiding groove is formed on an inner wall of the sleeve.

13. The communication device according to claim 11, wherein an extension direction of the at least one guiding groove is inclined to an elevating and subsiding direction of the upper casing.

14. The communication device according to claim 11, wherein a top end of the sleeve has at least one gap connected to the at least one guiding groove.

15. The communication device according to claim 11, wherein the first body has a pivoting assembly at the lower casing, the pivoting assembly protrudes into the sleeve, and the rotation axle is pivotally connected to the lower casing through the pivoting assembly.

16. The communication device according to claim 10, wherein the second body is rotatably connected to the first body along a rotation axis, and the rotation axis is parallel to an elevating and subsiding direction of the upper casing.

17. The communication device according to claim 10, wherein the at least one resonance space resonance space comprises a first resonance space and a second resonance space, the first audio module comprises two first speaker assemblies and two first microphone assemblies, one of the two first speaker assemblies and one of the two first microphone assemblies are disposed in the first resonance space, and the other one of the two first speaker assemblies and the other one of the two first microphone assemblies are disposed in the second resonance space.

18. The communication device according to claim 17, comprising a sensor disposed in the first body and adapted to sense a relative location of the first resonance space and the second resonance space.

19. The communication device according to claim 18, wherein when the second body covers the first audio module, and the sensor senses the first resonance space to be located above the second resonance space, the one of the two first speaker assemblies disposed in the first resonance space and the other one of the two first microphone assemblies disposed in the second resonance space are turned on, and the other one of the two first speaker assemblies disposed in the second resonance space and the one of the two first microphone assemblies disposed in the first resonance space are turned off.

20. The communication device according to claim 17, wherein the second audio module comprises a plurality of second speaker assemblies and a plurality of second microphone assemblies, some of the plurality of second speaker assemblies and some of the plurality of second microphone assemblies are disposed in the first resonance space, and the other second speaker assemblies and the other second microphone assemblies are disposed in the second resonance space.

21. The communication device according to claim 10, wherein when the second body exposes at least one portion of the second audio module, the second audio module is turned on.

22. The communication device according to claim 10, wherein the first body has a switch, when the second body rotates and triggers the switch, the communication device is in the first operation mode, and when the second body rotates and does not trigger the switch, the communication device is in the second operation mode.

* * * * *